United States Patent
Cao (10) Patent No.: US 11,138,498 B2
(45) Date of Patent: Oct. 5, 2021

(54) COMPUTING UNIT

(71) Applicant: Shenzhen Genorivision Technology Co., Ltd., Shenzhen (CN)

(72) Inventor: Peiyan Cao, Shenzhen (CN)

(73) Assignee: SHENZHEN GENORIVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/857,554

(22) Filed: Apr. 24, 2020

(65) Prior Publication Data
US 2020/0250519 A1    Aug. 6, 2020

Related U.S. Application Data

(63) Continuation of application No. PCT/CN2017/107776, filed on Oct. 26, 2017.

(51) Int. Cl.
*G06N 3/063*      (2006.01)

(52) U.S. Cl.
CPC .................... *G06N 3/063* (2013.01)

(58) Field of Classification Search
CPC .......................................... G06N 3/063
See application file for complete search history.

(56) References Cited

U.S. PATENT DOCUMENTS

| | | | | |
|---|---|---|---|---|
| 10,311,375 B2 * | 6/2019 | Basu | ........................ | G06F 17/16 |
| 2007/0040614 A1 * | 2/2007 | Camuffo | ................. | H03L 7/095 |
| | | | | 331/1 A |
| 2007/0241825 A1 * | 10/2007 | Birth | ..................... | H03L 7/0898 |
| | | | | 331/25 |
| 2017/0003703 A1 * | 1/2017 | Um | ........................... | G05F 3/26 |
| 2017/0368682 A1 * | 12/2017 | Danjo | .................... | G06N 3/063 |
| 2018/0211165 A1 * | 7/2018 | Oh | .......................... | G06N 3/063 |

FOREIGN PATENT DOCUMENTS

| | | |
|---|---|---|
| CN | 102004466 A | 4/2011 |
| CN | 204480299 U | 7/2015 |
| CN | 105760933 A | 7/2016 |

OTHER PUBLICATIONS

Vodenicarevic, D., Locatelli, N., Abreu Araujo, F. et al. A Nanotechnology-Ready Computing Scheme based on a Weakly Coupled Oscillator Network. Sci Rep 7, 44772 (2017). (Year: 2017).*
PCT/CN2017/107776 ISA210 dated Aug. 1, 2018.
PCT/CN2017/107776 ISA237 dated Aug. 1, 2018.

* cited by examiner

*Primary Examiner* — Alexey Shmatov
*Assistant Examiner* — Ahsif A. Sheikh
(74) *Attorney, Agent, or Firm* — IPro, PLLC; Qian Gu; Na Xu (57) ABSTRACT

Disclosed herein is a system, which comprises a plurality of processing units. Each of the processing units comprises a first oscillator, a second oscillator, and a counter. Each of the processing units is configured to receive a first input and a second input and to send an output as a function of the first input and the second input. The function has a plurality of parameters. Each of the processing units is configured to receive and send values of the parameters. The system can be used together with a microprocessor to perform parallel computing.

25 Claims, 10 Drawing Sheets

COMPUTING UNIT

TECHNICAL FIELD

The disclosure herein relates to a computing unit, particularly relates to a computing unit operating analog signals.

BACKGROUND

Artificial neural networks are mathematical or programming models inspired by biological neural networks. An artificial neural network contains a network of processing units called artificial neurons, which are modeled based on the basic properties of a biological neuron. An artificial neuron computes and generates impulses. For instance, an artificial neuron accepts a set of inputs to generate the weighted sum, and then passes the result to an activation function (such as a sigmoid function) to make an output. The artificial neurons are highly inter-connected by weighted links.

An artificial neural network enables a computer to learn from observational data (such as new input-output patterns provided by a user), adjust system parameters (such as the weights of the inputs) and achieve functionality through learning processes. Artificial neural networks have shown great potential and advantages in application areas such as signal and image recognition and some other predicting systems. An artificial neural network can be carefully designed to meet specific application needs by choosing suitable network topology, neural model, and learning rules, etc.

The learning process of an artificial neural network for a complex system usually needs a massive number of repetitions in presenting the sample patterns until the neural network can function correctly, which costs a lengthy amount of time. To reduce the learning time of artificial neural networks, parallel computing may be used to distribute and parallelize the computing tasks that can be done concurrently, since artificial neural networks are inherently parallel algorithms and not all of the computing tasks are required to be performed in order.

Parallel computing is a type of computation in which many calculations or executions of processes are carried out simultaneously. For example, in parallel computing, a computational task of a large problem is broken down to several very similar subtasks that can be processed at the same time (either independently or with some inter-process communication), whose results are processed together to solve the problem in the end.

Parallel computing for training and simulation of an artificial neural network are often carried out with hardware that supports certain level of parallelism, such as multicore and multiprocessor computers (e.g., graphical processing unit) having multiple processing elements within a single machine, or multiple computers (e.g., clusters, MPP, etc.) working on a same task. Meanwhile, current hardware has certain limitations, such as the limiting number of transistors that can be integrated onto a computer chip, bandwidth limitation for data transmission between memories and processing units, etc. Efforts are being made to address these issues, including designing specialized parallel computer architectures.

SUMMARY

Disclosed herein is a system comprising: a plurality of processing units, each of the processing units comprising a first oscillator, a second oscillator, and a counter; wherein each of the processing units is configured to receive a first input and a second input and to send an output as a function of the first input and the second input, the function having a plurality of parameters; wherein each of the processing units is configured to receive and send values of the parameters.

According to an embodiment, each of the processing units further comprises a memory.

According to an embodiment, the first oscillator has a fixed oscillation frequency.

According to an embodiment, the second oscillator has an adjustable oscillation frequency.

According to an embodiment, the counter is configured to count a sum of a first number of cycles of the first oscillator during a first time period and a second number of cycles of the first oscillator during a second time period; wherein the first time period is a function of the first input, the second time period is a function of the second input; wherein the output is the sum.

According to an embodiment, the second oscillator is configured to oscillate at a frequency being a function of the second input for a time period being a function of the first input; wherein the counter is configured to count a number of cycles of the second oscillator in the time period; wherein the output is a function of the number.

According to an embodiment, the second oscillator is configured to oscillate at a frequency being a function of the second input; wherein the counter is configured to count a difference between a number of cycles of the first oscillator and a number of cycles of the second oscillator in a time period; wherein the time period is a function of the first input; wherein the output is a function of the difference.

According to an embodiment, the second oscillator is a current starved voltage controlled oscillators (CSVCO).

According to an embodiment, the first input and second input are digital signals and at least one of the processing units further comprises a digital-to-analog converter configured to convert the first input or second input of the at least one processing unit to an analog signal.

According to an embodiment, the plurality of parameters comprises weights for the first input and the second input.

According to an embodiment, the first input and second input are analog signals.

According to an embodiment, the function is a continuous function of the first input and the second input.

According to an embodiment, the output is an output from an analog circuit.

According to an embodiment, each of the processing units is configured to send the output to at least one other processing unit among the plurality.

According to an embodiment, each of the processing units is configured to receive the first input or the second input from at least one other processing unit among the plurality.

According to an embodiment, each of the processing units is configured to receive from at least one other processing unit among the plurality or send to at least one other processing unit among the plurality, the values of the parameters.

Disclosed herein is a system comprising: a plurality of processing units, each of the processing units comprises an arithmetic logic unit (ALU) but not a floating-point unit (FPU); wherein each of the processing units is configured to receive a first input and a second input and to send an output as a function of the first input and a second input, the function having a plurality of parameters; wherein each of the processing units is configured to receive and send values of the parameters.

According to an embodiment, each of the processing units further comprises a memory.

According to an embodiment, the first input and second input are analog signals and the system further comprises an analog-to-digital converter configured to convert the first input or second input to a digital signal.

According to an embodiment, the plurality of parameters comprises weights for the first input and the second input.

According to an embodiment, the function is a continuous function of the first input and the second input.

According to an embodiment, each of the processing units is configured to send the output to at least one other processing unit among the plurality.

According to an embodiment, each of the processing units is configured to receive the first input or the second input from at least one other processing unit among the plurality.

According to an embodiment, each of the processing units is configured to receive from at least one other processing unit among the plurality or send to at least one other processing unit among the plurality, the values of the parameters.

Disclosed herein is a system comprising: one or more of the systems above, wherein the system is configured to execute a plurality of calculations or processing tasks simultaneously.

According to an embodiment, the system is used together with a microprocessor to perform parallel computing.

DETAILED DESCRIPTION

Figure 1A:
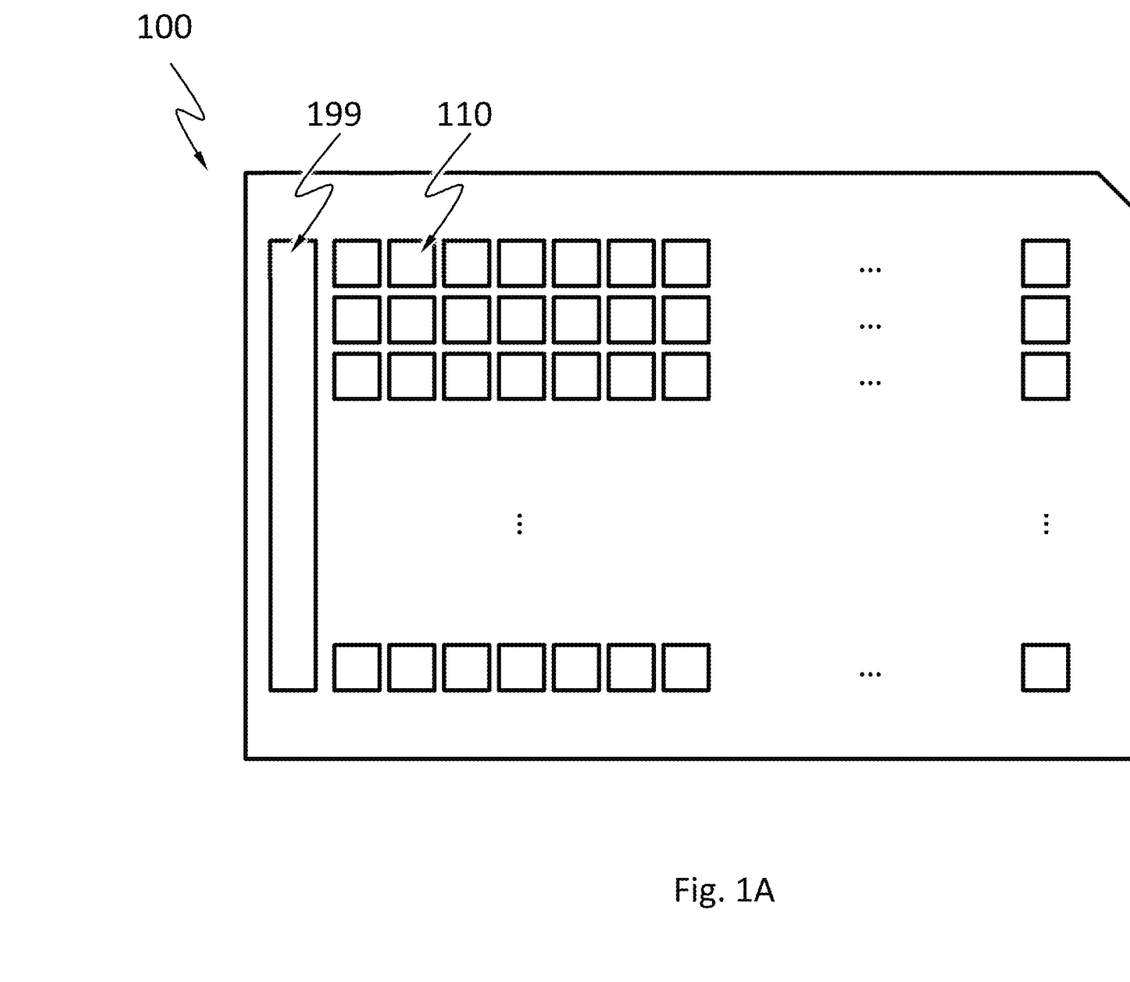
FIG. 1A schematically shows a system comprising a plurality of processing units, according to an embodiment.

FIG. 1A schematically shows a system 100 comprising a plurality of processing units 110, according to an embodiment. The system 100 may be a computing circuit and may be configured to carry out analog or digital signal processing.

Figure 1B:
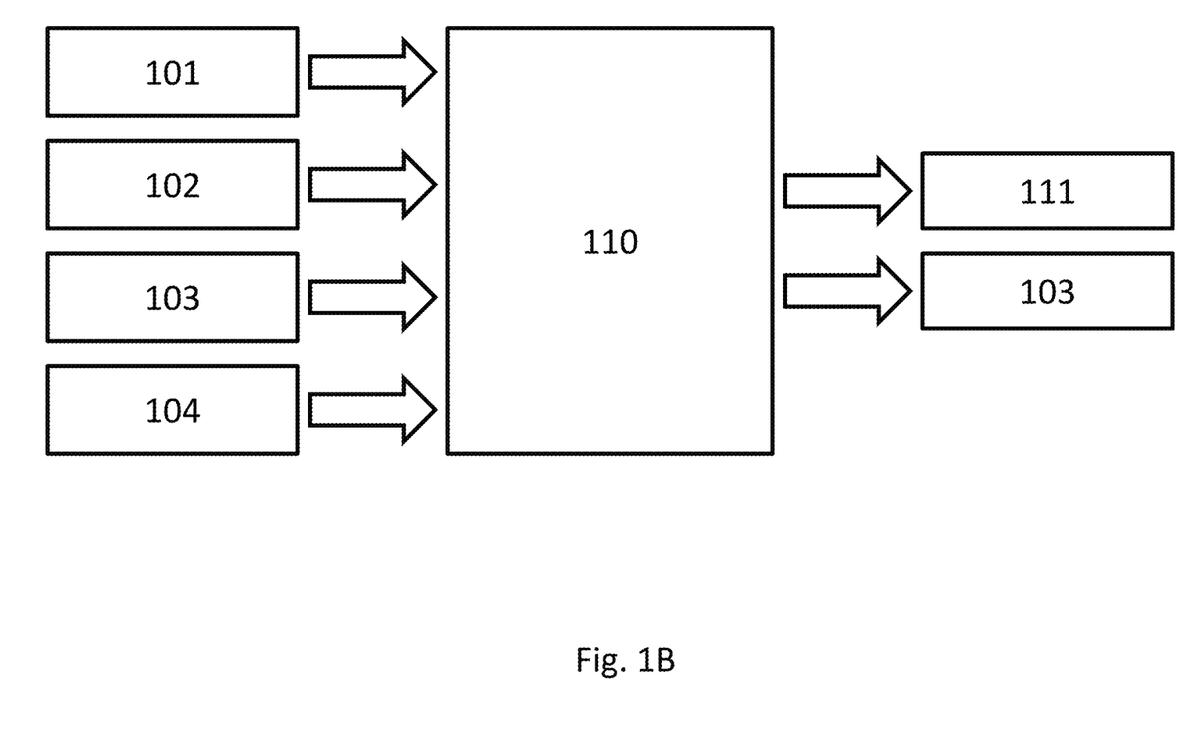
FIG. 1B schematically illustrates a block diagram of each of the processing units, according to an embodiment.

FIG. 1B schematically illustrates a block diagram of each of the processing units 110, according to an embodiment. Each of the processing units 110 may be configured to receive a first input 101 and second input 102 and to send out an output 111. Each of the processing unit 110 may be configured to perform one or more operations (such as addition, multiplication, other mathematical operations and logical operations, etc.) on the first input 101, the second input 102, or both. The output 111 may be a result of the one or more operations and may be a function of the first input 101, the second input 102, or both. The function may be a continuous function of the first input 101, the second input 102, or both. The function may have a plurality of parameters 103. In an embodiment, the parameters 103 may comprise weights for the first input 101 and the second input 102. Each of the processing units 110 may be configured to receive and send values of the parameters 103. In an embodiment, each of the processing units 110 may receive an instruction stream 104 comprising a series of command signals. The command signals may cause the processing units 110 to perform a specific task or to operate in a specific mode. For example, one command signal may cause one of the processing units 110 to carry out an addition operation and output the result, and a following command signal may instruct the processing unit 110 to reset to an initial state before carrying out another operation.

In an embodiment, the system 100 may further comprise a common memory 199. The common memory 199 may connect to at least some of the processing units 110 and other circuitries (e.g., outside circuitry or other circuitries of the system 100), and may be configured to store command signals or to store some data of the system 100. For example, the common memory 199 may be configured to store the output signals from some of the processing units 110 so that other circuitries may access and further process the output signals.

In an embodiment, at least one of the processing units 110 may further comprise a digital-to-analog converter (DAC). When an input signal (e.g., the first input 101, or the second input 102) of the processing units 110 is digital (e.g., a binary number), the DAC may convert the input signal to an analog signal (e.g., a voltage). The DAC may be a switched resistor DAC comprising a parallel resistor network or a switched capacitor DAC comprising a parallel capacitor network. In an embodiment, the values of the parameters 103 may also be digital, and the DAC may be configured to convert the values of the parameters 103 to analog signals. In an embodiment, the first input 101 and second input 102 may be analog signals. The values of the parameters 103 (e.g., the weights for the first input 101 and the second input 102) may be analog signals.

In an embodiment, each of the processing units 110 may be configured to send the output 111 to at least one other processing unit 110. Some of the processing units 110 may be configured to send the outputs 111 to the common memory 199 of the system 100 or other circuitries (e.g., the outside circuitry or some other circuitries of the system 100). In an embodiment, each of the processing units 110 may be configured to receive its first input 101 or its second input 102 from at least one other processing unit 110. Some processing units 110 may be configured to receive its first input 101 or its second input 102 from the common memory 199 or the outside circuitry. In an embodiment, each of the processing units 110 may be configured to receive the values of its parameters 103 from at least one other processing unit 110. Some processing units 110 may be configured to receive the values of the parameters 103 from local memories (e.g., a local RAM in FIG. 2) of these processing units 110, the common memory 199, or the outside circuitry. Each of the processing units 110 may be configured to send the values of the parameters 103 to at least one other processing unit 110.

Figure 2:
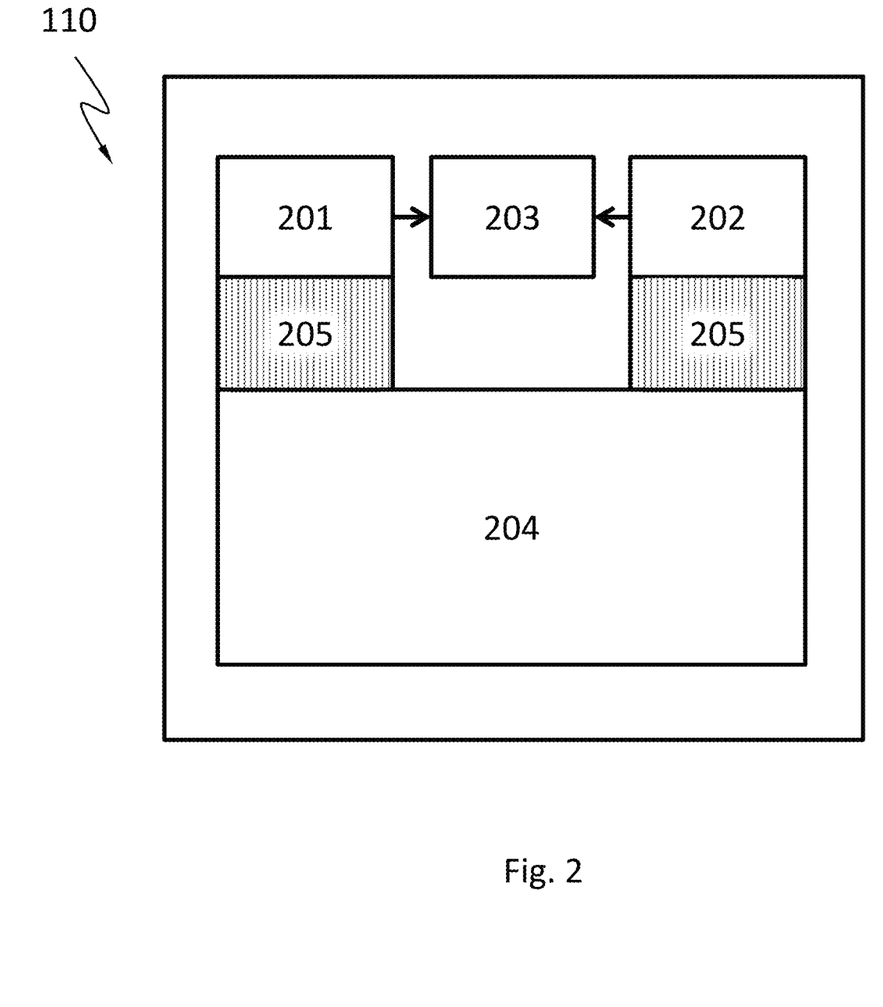
FIG. 2 schematically shows a component diagram of one of the processing units, according to an embodiment.

FIG. 2 schematically shows a component diagram of one of the processing units 110, according to an embodiment. The processing unit 110 may comprise a first oscillator 201, a second oscillator 202, and a counter 203. The counter 203 may be configured to communicate with the first oscillator 201 and the second oscillator 202, and to count the number of cycles of one or both oscillators 201 and 202 within a period of time. The processing unit 110 may further comprise a local memory 204 and a local bus 205. The local memory 204 of the processing unit 110 may be configured to store command signals and data (e.g., values of the parameters 103) of this processing unit. Some components of the processing unit 110 (e.g., the first oscillator 201, the second oscillator 202, etc.) may be configured to communicate with the local memory 204 through the local bus 205 so that they may quickly obtain the command signals and data stored in the local memory 204. In an embodiment, the processing unit 110 may further comprise additional circuitries or electronics (such as a delay module, input and output circuitries, etc.).

In an embodiment, the first oscillator 201 may have a fixed oscillation frequency. The oscillation frequency of the second oscillator 202 may be adjustable. The oscillation frequency of the second oscillator 202 may be controlled by a control signal (e.g., electronic voltage or current) to the second oscillator 202. For example, the second oscillator 202 may be a current starved voltage controlled oscillator (CSVCO), whose frequency may be determined by a voltage supplied to the CSVCO.

In an embodiment, the processing unit 110 may be configured to carry out mathematical operations (e.g., addition, multiplication, etc.) with the first oscillator 201, the second oscillator 202, the counter 203, and some of the additional circuitries and electronics (e.g., the delay module).

Figure 3:
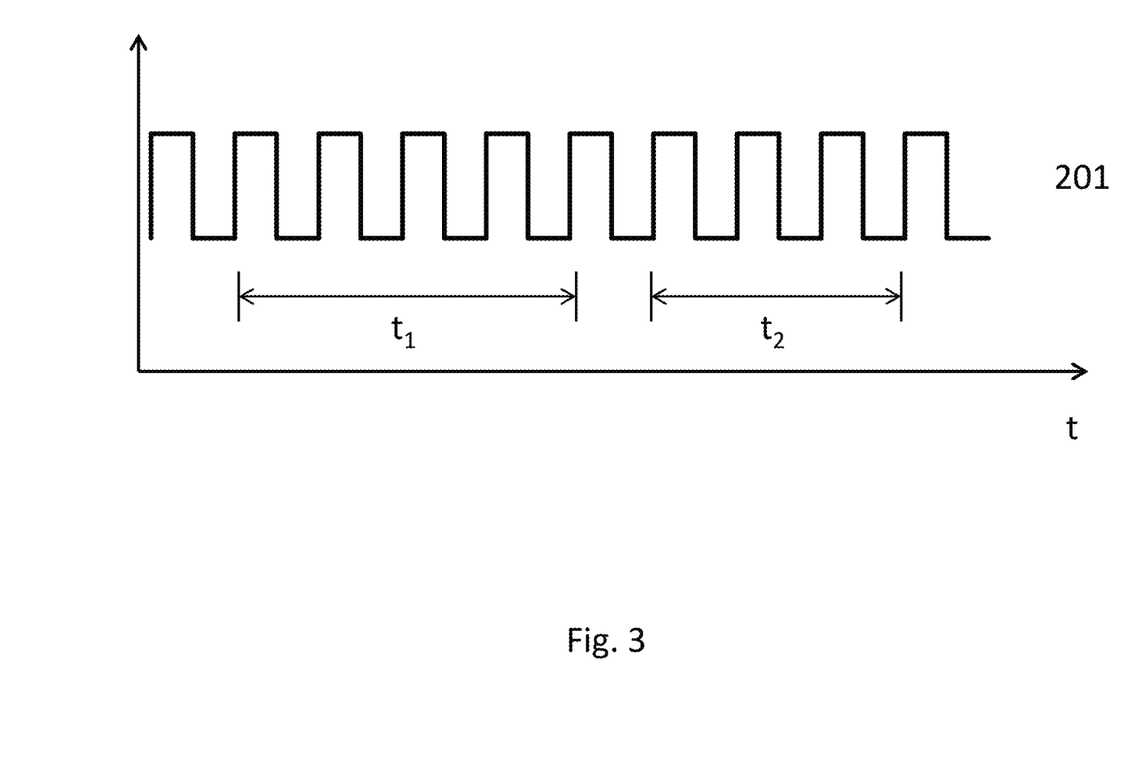
FIG. 3 schematically illustrates the processing unit performing an addition operation, according to an embodiment.

FIG. 3 schematically illustrates the processing unit 110 performing an addition operation, according to an embodiment. The counter 203 counts the number of cycles of the first oscillator 201 during a time period $t_1$, and without being reset, continues to count the number of cycles of the first oscillator 201 during a time period $t_2$. The length of the time period $t_1$ is proportional to the first input 101 and the length of the time period $t_2$ is proportional to the second input 102. Because the first oscillator 201 oscillates at a fixed frequency, the number of cycles of the first oscillator 201 in a given time period is proportional to the length of the time period. Therefore, the number of cycles of the first oscillator 201 during a time period $t_1$ is proportional to the first input 101 and the number of cycles of the first oscillator 201 during a time period $t_2$ is proportional to the second input 102. Thus, the number of cycles the counter 203 counted during the two time periods $t_1$ and $t_2$ is a weighted sum of the first input 101 and the second input 102. The counter 203 may be paused but not reset between the end of the time period $t_1$ and the beginning of the time period $t_2$. In an embodiment, the output 111 is a function of the number of cycles the counter 203 counted during the two time periods $t_1$ and $t_2$.

The time periods (e.g., $t_1$ and $t_2$) in which the counter 203 counts cycles of the oscillators may be controlled by a delay module. For example, a time period may be set as a function of the time constant of the delay module.

Figure 4A:
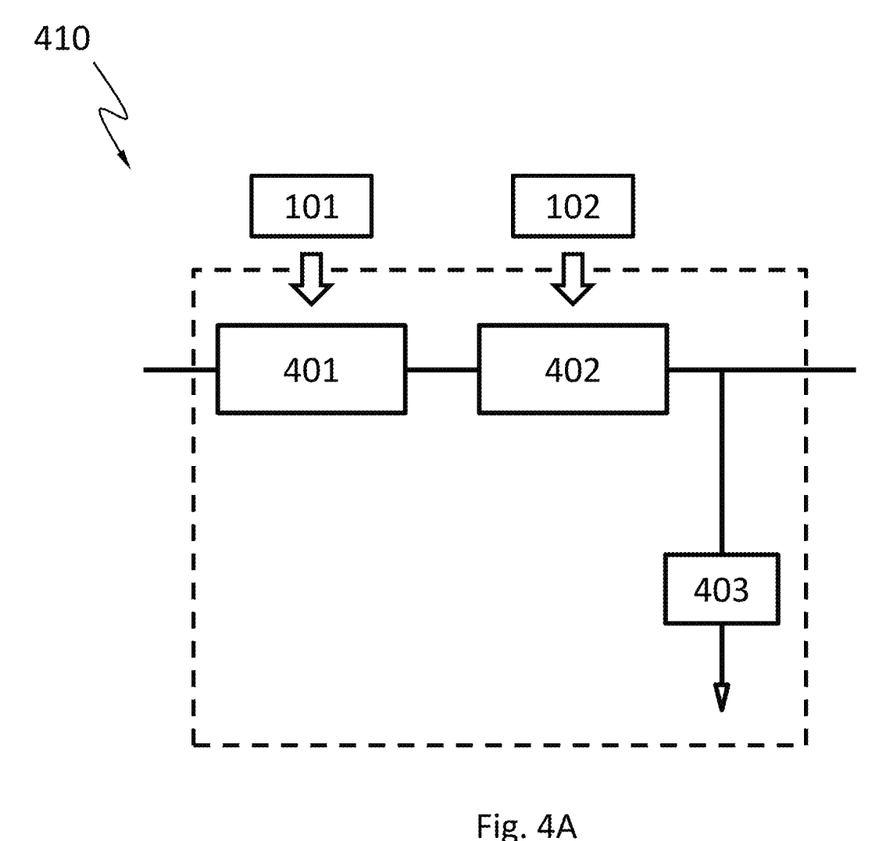
FIG. 4A schematically shows a delay module that the processing unit may comprise, according to an embodiment.

FIG. 4A schematically shows a delay module 410 that the processing unit 110 may comprise, according to an embodiment. The delay module 410 may be configured to produce a time delay based on one or both of the inputs 101 and 102, during which the counter 203 counts cycles of one or both of the oscillators 201 and 202. The delay module 410 may be a RC circuit comprising a first programmable resistor 401, a second programmable resistor 402, and a capacitor 403. The resistances $R_A$ and $R_B$ of the first and second programmable resistors 401 and 402 may be adjusted by control signals (e.g., electric voltage or current). The control signals may be functions of the inputs 101 and 102. In an embodiment, the resistance $R_A$ may be a function of the first input 101, and the resistance $R_B$ may be a function of the second input 102. The first second programmable resistor 401 or the second programmable resistor 402 may be a voltage-controlled resistor such as a junction field-effect transistor (JFET), which is a three-terminal variable resistor where the resistance value between two of the terminals is controlled by a voltage potential applied to the third. Under certain operating conditions, the resistance of the drain-source channel of the JFET is a function of the gate-source voltage and the JFET behaves as a resistor with tunable resistance. The capacitance of the capacitor 403 may be fixed. The time constant of the delay module 410 is affected by the resistances of the programmable resistors 401 and 402.

Figure 4B:
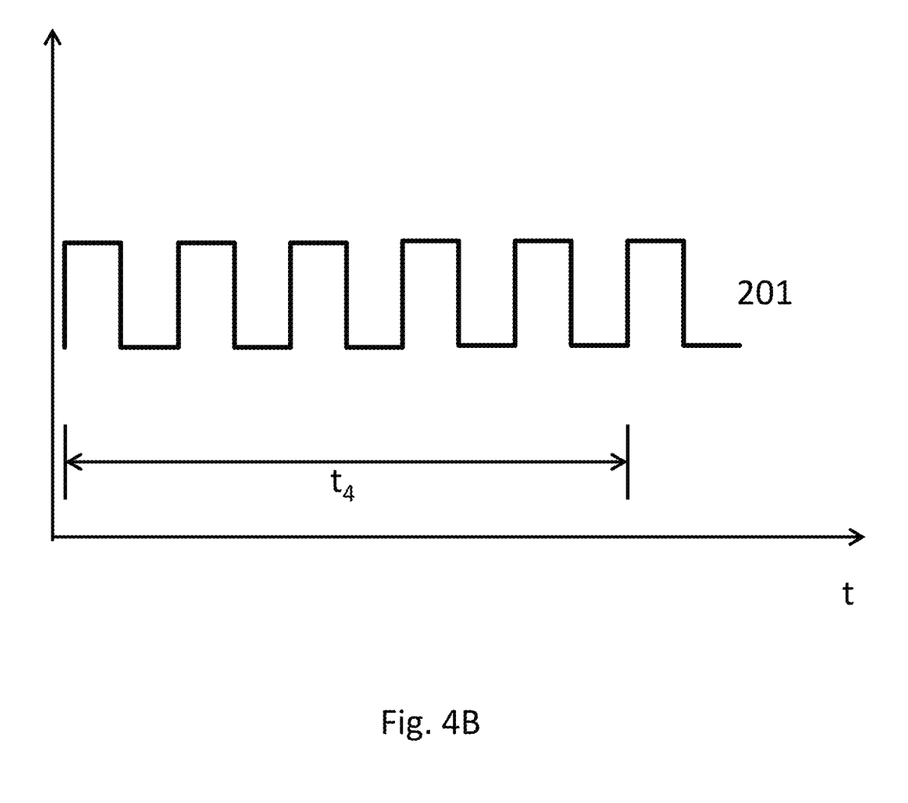
FIG. 4B schematically illustrates the processing unit performing an addition operation, according to an embodiment.

FIG. 4B schematically illustrates the processing unit 110 performing an addition operation, according to an embodiment. The counter 203 counts the number of cycles of the first oscillator 201 during a time period $t_4$, which is a function of a weighted sum of the first input 101 and the second input 102. In an example, the delay module 410 (e.g., the RC circuit in FIG. 4A) may be used to produce the time period $t_4$. In the example of FIG. 4A, the programmable resistors 401 and 402 may be electrically connected in series and their resistances being respectively proportional to the first input 101 and the second input 102. The time period $t_4$ may be a function of the time constant of the delay module 410, which in turn is a function of the weighted sum of the first input 101 and the second input 102 when the capacitance of the capacitor 403 is fixed. Because the first oscillator 201 oscillates at a fixed frequency, the number of cycles of the first oscillator 201 in a given time period is proportional to the length of the time period. Therefore, the number of cycles of the first oscillator 201 counted by the counter 203 during the time period $t_4$ is proportional to the length of $t_4$, and is a function of the weighted sum of the first input 101 and the second input 102. In an embodiment, the output 111 may be a function of the number of cycles the counter 203 counted during the time period $t_4$.

Figure 5:
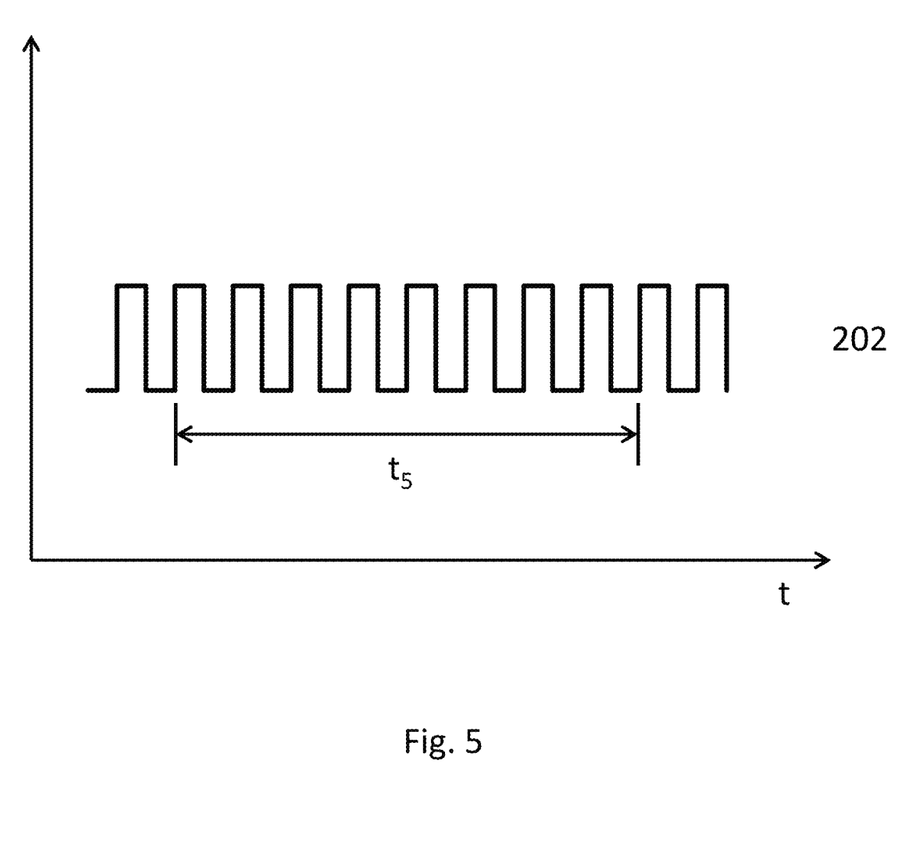
FIG. 5 schematically shows the processing unit performing a multiplication operation, according to an embodiment.

FIG. 5 schematically shows the processing unit 110 performing a multiplication operation, according to an embodiment. The second oscillator 202 may be configured to oscillate at a frequency that is proportional to the second input 102. For example, the second input 102 is a voltage signal and is supplied to the second oscillator 202 as the control signal that determines the frequency of the second oscillator 202. The counter 203 counts the number of cycles of the second oscillator 202 during a time period $t_5$. The time period $t_5$ may be proportional to the first input 101. The number of cycles of the second oscillator 202 during the time period $t_5$ is thus proportional to a product of the frequency of the second oscillator 202 and the time period $t_5$. Therefore, the number of cycles of the second oscillator 202 during the time period $t_5$ is proportional to a product of the first input 101 and the second input 102. In an embodiment, the output 111 may be a function of the number of cycles the counter 203 counted during the time period $t_5$.

Figure 6:
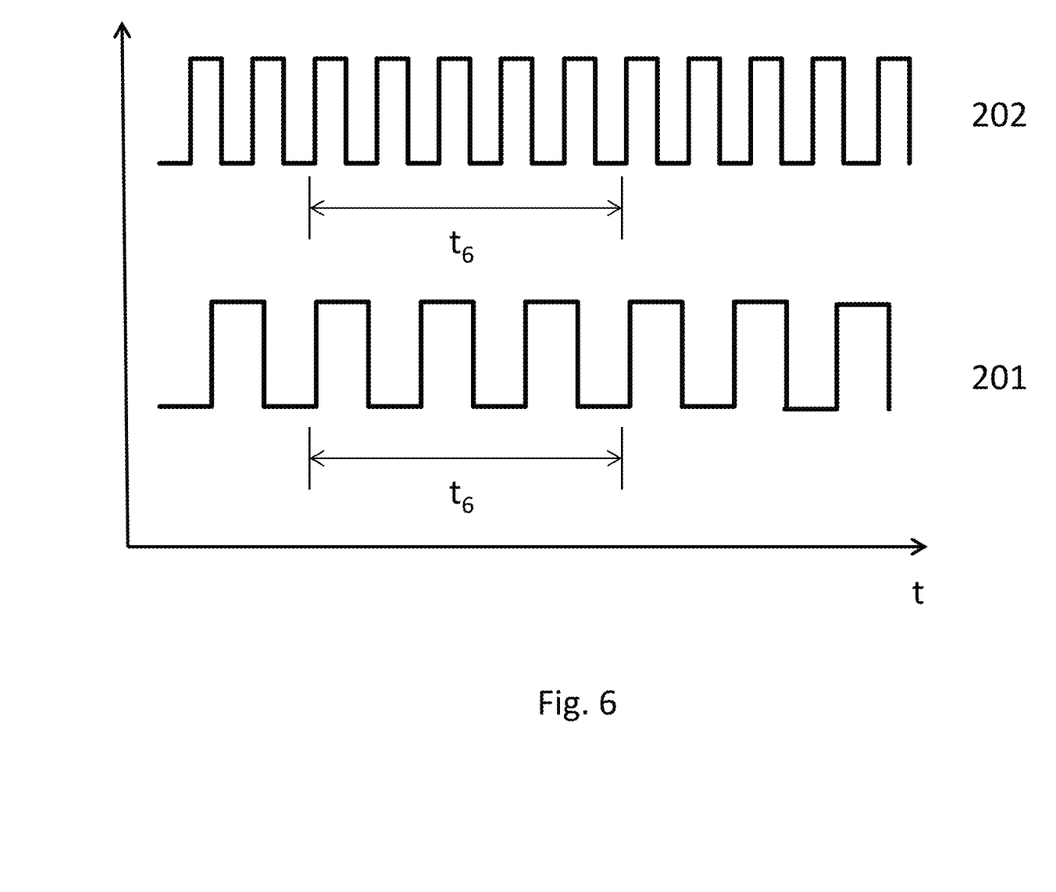
FIG. 6 schematically shows the processing unit performing a multiplication operation, according to an embodiment.

FIG. 6 schematically shows the processing unit 110 performing a multiplication operation, according to an embodiment. The first oscillator 201 oscillates at a fixed frequency $f_1$. The second oscillator 202 oscillates at a frequency $f_2$ that is proportional to the second input 102. For example, the second input 102 is a voltage signal and is supplied to the second oscillator 202 as the control signal that determines the frequency $f_2$ of the second oscillator 202. The counter 203 counts a difference between the number of cycles of the first oscillator 201 and the number of cycles of the second oscillator 202 during a time period $t_6$. The time period $t_6$ may be proportional to the first input 101. In the example of FIG. 6, the counter 203 may be a bidirectional counter, which is configured to count in both directions (i.e., either up or down). During the time period $t_6$, the counter 203 counts up by one when it receives a pulse from one oscillator (e.g., the first oscillator 201) and counts down by one when it receives a pulse from the other oscillator (e.g., the second oscillator 202). Therefore, the difference between the number of cycles of the first oscillator 201 and the number of cycles of the second oscillator 202 the counter 203 counts during the time period $t_6$ is a function of the product of the first input 101 and the second input 102. In an embodiment, the output 111 may be a function of the difference the counter 203 counted during the time period $t_6$.

Figure 7:
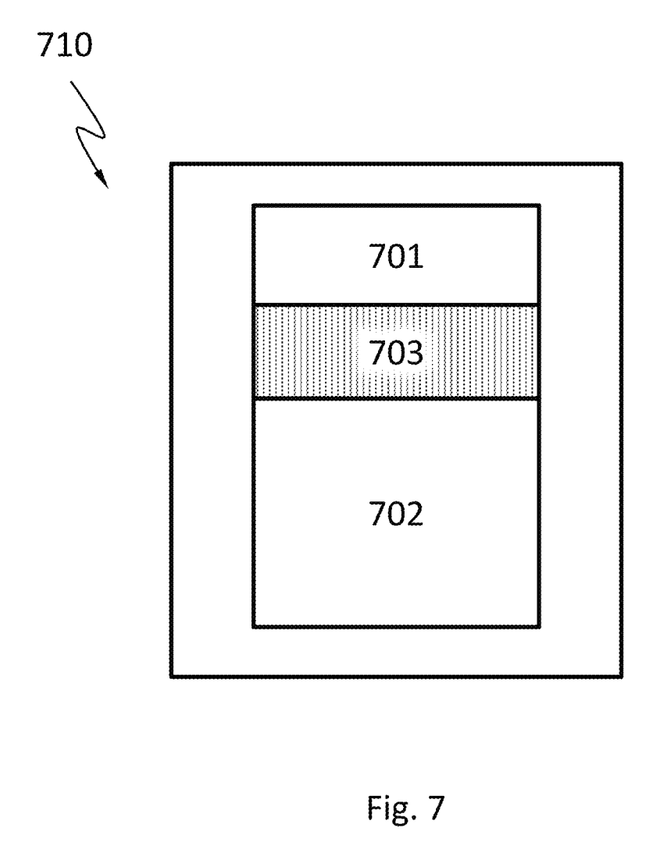
FIG. 7 schematically shows a block diagram of the processing unit, according to an embodiment.

FIG. 7 schematically shows a block diagram of the processing unit 710, according to an embodiment. The processing unit 710 may be an embodiment of the processing unit 110 in FIG. 1A and may comprise an arithmetic logic unit (ALU) 701 but not a floating-point unit (FPU). The ALU 701 may be a digital electronic circuit and configured to perform one or more arithmetic operations (e.g., addition, multiplication, etc.) or logical operations on integer numbers. In an embodiment, the processing unit 710 may further comprise a local memory 702 and a local bus 703. The local memory 702 may be configured to store command signals and data of the processing unit 710. The ALU 701 of the processing unit 710 may connect to the local memory 702 and quickly obtain the command signals and data through the local bus 703. In an embodiment, the first input and second input of the ALU 701 may be analog signals, and the system may further comprise an analog-to-digital converter (ADC) configured to convert the first input or second input to a digital signal.

Figure 8:
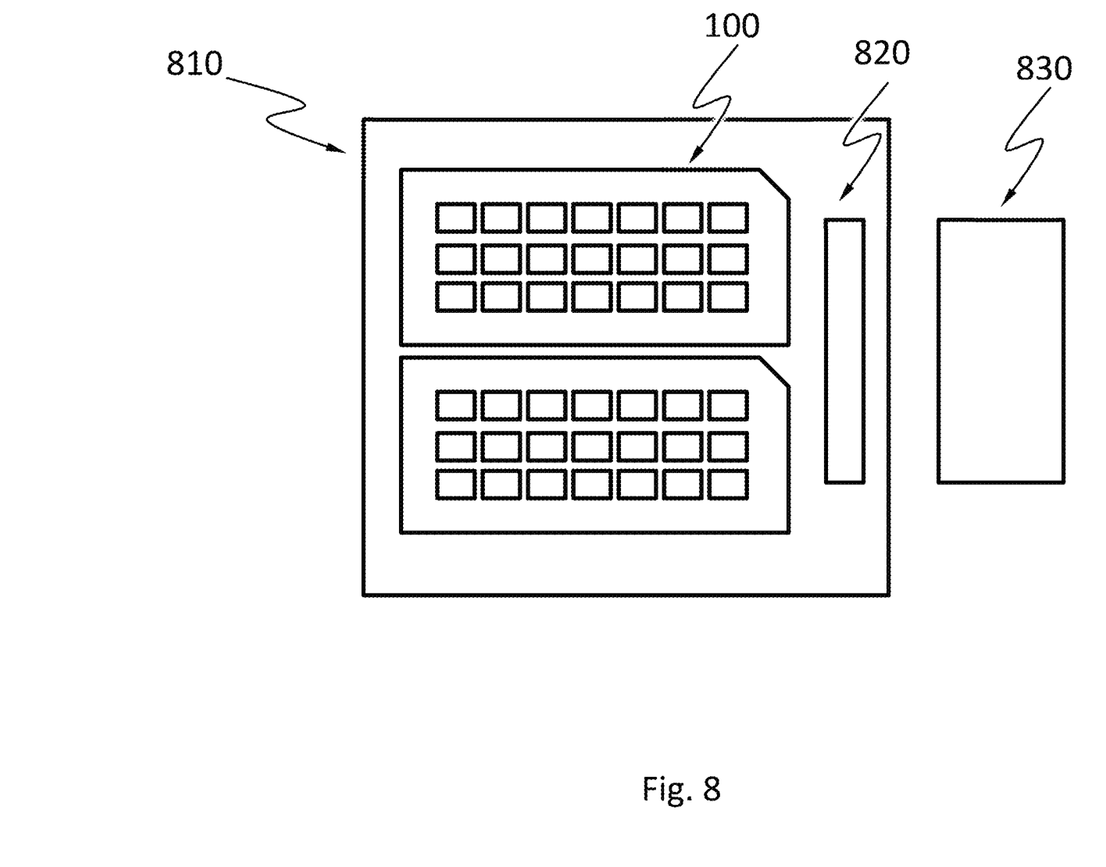
FIG. 8 schematically shows a system comprising one or more of the system described herein, according to an embodiment.

FIG. 8 schematically shows a system 810 comprising one or more of the system 100 described herein, according to an embodiment. The system 810 may further comprise other hardware components 820 (e.g., a shared memory, on-chip registers, buses), which allow the system 810 to communicate with outside circuitries. For example, the system 810 may be used together with a microprocessor 830 (e.g., a CPU) to perform parallel computing (e.g., for neural network simulation), in which the system 810 may be configured to execute massive calculations and processing tasks simultaneously.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system comprising:
a plurality of processing units, each of the processing units comprising an oscillator and a counter;
wherein each of the processing units is configured to receive a first input and a second input and to send an output as a function of the first input and the second input, the function having a plurality of parameters;
wherein each of the processing units is configured to receive and send values of the parameters;
wherein the oscillator is configured to oscillate at a frequency being a function of the second input for a time period being a function of the first input;
wherein the counter is configured to count a number of cycles of the oscillator in the time period;
wherein the output is a function of the number.

2. The system of claim 1, wherein each of the processing units further comprises a memory.

3. The system of claim 1, wherein the second oscillator has an adjustable oscillation frequency.

4. The system of claim 1, wherein the oscillator is a current starved voltage controlled oscillator (CSVCO).

5. The system of claim 1, wherein the first input and second input are digital signals and at least one of the processing units further comprises a digital-to-analog converter configured to convert the first input or second input of the at least one processing unit to an analog signal.

6. The system of claim 1, wherein the plurality of parameters comprises weights for the first input and the second input.

7. The system of claim 1, wherein the first input and second input are analog signals.

8. The system of claim 1, wherein the function is a continuous function of the first input and the second input.

9. The system of claim 1, wherein the output is an output from an analog circuit.

10. The system of claim 1, wherein each of the processing units is configured to send the output to at least one other processing unit among the plurality.

11. The system of claim 1, wherein each of the processing units is configured to receive the first input or the second input from at least one other processing unit among the plurality.

12. The system of claim 1, wherein each of the processing units is configured to receive from at least one other processing unit among the plurality or send to at least one other processing unit among the plurality, the values of the parameters.

13. A system comprising:
a plurality of processing units, each of the processing units comprising a first oscillator, a second oscillator, and a counter;
wherein each of the processing units is configured to receive a first input and a second input and to send an output as a function of the first input and the second input, the function having a plurality of parameters;
wherein each of the processing units is configured to receive and send values of the parameters;
wherein the second oscillator is configured to oscillate at a frequency being a function of the second input;
wherein the counter is configured to count a difference between a number of cycles of the first oscillator and a number of cycles of the second oscillator in a time period; wherein the time period is a function of the first input;
wherein the output is a function of the difference.

14. The system of claim 13, wherein each of the processing units further comprises a memory.

15. The system of claim 13, wherein the first oscillator has a fixed oscillation frequency.

16. The system of claim 13, wherein the second oscillator has an adjustable oscillation frequency.

17. The system of claim 13, wherein the second oscillator is a current starved voltage controlled oscillator (CSVCO).

18. The system of claim 13, wherein the first input and second input are digital signals and at least one of the processing units further comprises a digital-to-analog converter configured to convert the first input or second input of the at least one processing unit to an analog signal.

19. The system of claim 13, wherein the plurality of parameters comprises weights for the first input and the second input.

20. The system of claim 13, wherein the first input and second input are analog signals.

21. The system of claim 13, wherein the function is a continuous function of the first input and the second input.

22. The system of claim 13, wherein the output is an output from an analog circuit.

23. The system of claim 13, wherein each of the processing units is configured to send the output to at least one other processing unit among the plurality.

24. The system of claim 13, wherein each of the processing units is configured to receive the first input or the second input from at least one other processing unit among the plurality.

25. The system of claim 13, wherein each of the processing units is configured to receive from at least one other processing unit among the plurality or send to at least one other processing unit among the plurality, the values of the parameters.

\* \* \* \* \*